Patented June 4, 1929.

1,715,970

UNITED STATES PATENT OFFICE.

ALFRED WILLIAMS, OF ALBANY, NEW YORK.

METHOD OF HYDRATING CROPS IN SEMIARID ZONES.

No Drawing. Application filed July 6, 1926. Serial No. 120,868.

This invention relates to the hydration of an area through the setting up disturbances of the equilibrium of the hydrostatic forces which operate in soil and rock, influencing the surface tension of water films adhering interstitially between the particles of soils, stimulating, accelerating and directively guiding the movement of capillary water, and reducing evaporation losses, by the means of electricity.

For a clear understanding of the means by which my invention accomplishes these actions, it should be borne in mind that all soils and most rocks are porous bodies, that physically they may be likened to manifold millions of twisted capillary tubes extending in three dimensions. Also, that where this capillary soil system touches the water level or water table below, the phenomenon of surface tension manifests itself and exerts an upward pull on the water which spreads itself out in films strongly adherent to the surfaces of the soil particles. This film movement, rapid for the first foot or two, progressively decreases in speed, thinning as it ascends, until it ceases when its force is equalized by gravitational pull. Roughly speaking, the average soil requires three to four months for capillarity to attain maximum height, some few feet. Laterally the travel is quicker.

It is upon this film water that the rootlets of plants feed. As the rootlet depletes the film of water, thinning it out, the surface tension increases with the result that water is pulled up from adjacent and communicating films which in their turn draw upon their neighbors further down until something like a stabilization is reached. This process is continuous as long as plant life absorbs water or evaporation wastes it.

Speaking generally, in humid climates the lower portion of the soil is amply supplied from the water table and, unless dense bands of clay or hardpan intervene the capillary system works at its maximum. But in some two fifths of the United States the underground water is for various reasons so situated that is not readily available for capillary feeding to satisfy the crop's hydration capacity. The immediate water under the cultivated ground may be insufficient, the capillary system of the soil, on account of its texture, may feed too slowly to meet plant hydration needs, or the capillaries might be obstructed with silted materials. Many reasons retard the water from getting to the rootlets.

The same reasons apply, also, in case of desired well water. There may be ample moisture scattered about which if it could be collected together would supply the needs of a well, but it is not possible to pump moisture into a concentrated liquid form.

Having set forth the conditions under which my invention is intended to operate, I will now describe the method by which it is carried out.

From the surface of the soil one or more conducting rods, iron for instance, are driven downward into the earth, or metallic wires may be laid in one or more deep plough furrows. Such an arrangement constitutes the receiving electrode.

Another electrode is prepared by the use of conducting plates of large area, and buried in the water table or other place of a maximum water content, or even in a suitable spot at a considerable distance away. This constitutes the transmitting electrode.

The two electrodes are now connected by wire to a source of electrical energy which delivers a direct current, a rectified alternating current, or electromagnetic waves suitably polarized. In the latter case an aerial electrode would be used in addition. As direct current or rectified alternating current are at present more economical I will confine further description to such.

When electricity is passed from the transmitting, or positive electrode, to the receiving, or negative electrode, lines of force are established in the soil and which, if the latter be of homogeneous composition, will have directions like those of magnetic force due to a magnet which has its poles at the electrodes. In proceeding along any line of force the potential will fall steadily from the positive to the negative electrode. The line of steepest potential gradient will be in a straight line from electrode to electrode; but on either side of that line and in the crust of the earth beneath there will be curved lines of falling potential somewhat in the shape of an ellipse having an axis along the line joining the electrodes.

If the moisture content of the intervening medium is unevenly distributed the field of force so set up will be distorted, more energy following the concentrated moisture runs.

I find that along every line of force traversing and curving through the soil there is a movement of water towards the negative pole; that in the neighborhood of the negative pole thin water films thicken and that thermal water vapor rising to escape evaporatively to the atmosphere is arrested, its directing of movement changed until it finally condenses on negatively charged particles and becomes absorbed into the film system which is attracted to the negative electrode. If the electrode be vertical water will concentrate about it in the shape of a cone which grows in size and rises higher and higher constantly until a stage is reached when this upward movement is arrested, or, at least, slackened considerably. When this takes place a new phase manifests itself; the cone water, now having attained a given saturation, loses sufficient of its surface tension energy to no longer resist the pull of its peripheral films, and consequently there occurs a lateral diffusion of water in all directions until, the central and outlying surface tensions arriving at some degree of neutralization, the cone again begins its ascent towards the surface of the soil. This process is repeated continually until the whole negative area is saturated when, if the electrification is carried far enough, pools of water form on the surface. If the negative electrode consists of underground wires the operations are naturally varied, but the same result, hydration of the area is accomplished more rapidly.

I further find that this movement and concentration of water takes place even with very minute quantities of electricity. This is of first importance in arid regions inasmuch as the negative electrode may be in dry soil and the resistance of contact be many million ohms, and unless an electrical system is capable of "building up" minute moisture, such as that of the vapor or of hygroscopic state, into concentrations sufficient to permit of increasing conductivity, undesirable and expensive voltages would be required.

Having described the means by which my invention is carried out, and the observed facts relating thereto, I will now set forth what I assume to be the underlying theory in so far as I understand it.

The movement of water from positive to negative in the soil's capillary system is of a dynamic rather than chemical nature. This migration takes place with a fraction of decomposition voltage. That electrolytic disassociation, inevitable in liquid conduction, takes place is obvious; yet the water arrives at the negative with its solutes intact.

Moreover, the migration speed of the fastest chemical ions is but a few inches per hour, while the speed of the migrating water is incomparably greater. We may assume this movement to be general throughout the electrified area, subject to the same propelling and attractive forces, although each water molecule or bundle thereof must require a different time to reach the negative, a period dependent upon its original position in the field and the particular potential gradient along which it travels.

By virtue of its position in a maximum water content the propulsion of water from the positive electrode is simple and uniform. But in the negative area in arid or semi-arid localities other electrical and physical factors enter. There, near the surface, whatever capillary water may rise unassisted and uncontrolled electrically, much of it, and sometimes all, is lost in evaporation. From the surface downwards to the top of the attenuated water films there exists a zone where the soil's interstices are filled with water vapor in various degrees of density. Now, according to the kinetic theory of evaporation these highly mobile water molecules which have escaped beyond the range of attraction of the molecules constituting the capillary film, will, when their velocities are great enough and they avoid too many collisions with their neighbors, pass into the atmosphere. In time, unless prevented, all will escape. And it is this state of conditions that characterizes a soil where a crop fails to mature through unsatisfied hydration capacity. If, then, in such a zone we place a charge of negative electricity the upward movement of water vapor is checked, condensation takes place and the charged water moves as near as possible to the electrode.

Water vapor condenses more readily near negatively charged bodies. Most vapors are attracted most readily by positively charged bodies. Water is the exception, if not the only exception to this rule.

The following equation doubtless applies to the reactions which take place at the negative area:

If $Q$ is the electric charge on a drop of water of radius $R$, then $e$ the electrical energy is $-e=\tfrac{1}{2}Q^2/R$ As the drop evaporates $R$ diminishes but $Q$ remains the same. Therefore evaporation increases the electrical energy, and the presence of the charge makes evaporation more difficult.

What I claim as my invention:

1. The method of hydrating semi-arid zones comprising passing a uni-directional electric current from a moist region to the semi-arid region.

2. The method of hydrating semi-arid regions which comprises embedding a conductor of electricity underground in the dry region and passing a uni-directional electric current thereto from a relatively moist region.

3. The method of hydrating semi-arid regions which comprises embedding a conductor of electricity underground in the dry region, embedding another conductor underground in a relatively moist region and passing a uni-directional electric current from the moist region conductor to the dry region one.

In testimony whereof, I affix my signature.

ALFRED WILLIAMS.